SATURABLE CORE SQUARE WAVE OSCILLATOR WITH SWITCHING TRANSIENT REDUCING MEANS
Filed March 1, 1971

United States Patent Office 3,706,052
Patented Dec. 12, 1972

3,706,052

SATURABLE CORE SQUARE WAVE OSCILLATOR WITH SWITCHING TRANSIENT REDUCING MEANS

Robert F. Canup, Richmond, Va., assignor to Texaco Inc., New York, N.Y.

Filed Mar. 1, 1971, Ser. No. 120,033
Int. Cl. H03k 3/30
U.S. Cl. 331—113 A 6 Claims

ABSTRACT OF THE DISCLOSURE

Transistor oscillator of saturable core square wave type, it employs an output transformer and a saturable core transformer plus magnetic feedback means to absorb leakage-inductance effects.

BACKGROUND OF THE INVENTION

Field of the invention

This invention concerns oscillators in general and, particularly, relates to a square-wave saturable core oscillator circuit, of the type often referred to as an inverter.

Description of the prior art

In the field of square-wave oscillators, and particularly the type of saturable core square-wave oscillators known as the Jensen type, there has been a difficulty that is at least partially related to the leakage inductance of the output transformer. This difficulty involved extreme transients which are particularly noticeable in the collector-to-emitter wave forms of the transistors. These appear as high-voltage spikes which often have reached a magnitude that the transistors were damaged, unless a special transistor with abnormally high collector-to-emitter voltage characteristic was employed.

In addition, it was found that large leakage inductances could cause a reverse collector current flow through the transistor while it had been turned on but before the collector voltage had developed. Such current flow resulted from the decay of the magnetizing current. It could become excessive and cause overheating and consequent failure of the power transistors.

While the Jensen-type circuit was found preferable to the single transformer saturable core type known as the Uchrin-Royer, because the latter could not use a transformer made of conventional types of transformer materials, the Jensen-type circuit was still subject to the limitations noted above relating to the transistors. Consequently, it is an object of this invention to provide a means for substantially eliminating the detrimental switching transients that have been found to exist in prior oscillators of the Jensen type.

SUMMARY OF THE INVENTION

Briefly, this invention pertains to an improvement for a saturable core square-wave oscillator circuit wherein the said circuit comprises an output transformer and a saturable core transformer. The circuit also comprises a regenerative feedback winding on said saturable core transformer and a pair of transistors connected in push-pull for generating square-wave output signals in said output transformer. The improvement comprises means for absorbing leakage-inductance effects in said output transformer and increasing switching time of said transistors, whereby switching transients and transistor power dissipation are greatly reduced.

Again, briefly, the invention concerns a squarewave transistor oscillator which oscillator comprises an output transformer with a center-tapped winding thereon. It also comprises a saturable core transformer with a center-tapped winding and a feedback winding thereon, as well as a pair of transistors each having a biasing path and a transconductive path. It also comprises first circuit means for serially connecting said transconductive paths in opposite polarity across said output transformer winding, and second circuit means for serially connecting said biasing paths across said saturable core center-tapped winding. It also comprises third circuit means for connecting said feedback winding regeneratively across said output transformer winding, and a first additional winding on said output transformer. In addition, it comprises a second additional winding on said saturable core transformer, a capacitor and fourth circuit means for connecting said first and second additional windings in series-aiding relationship and in series with said capacitor.

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

It has been found that prior oscillators of the Jensen type have drawbacks that stem from the leakage inductance in the output transformer. Such leakage inductance causes high-magnitude voltage and current transients which occur as the transistors switch during the oscillation cycles. These transients, or "spikes," may reach such magnitude as to cause failure of the transistors. Thus, heretofore, in order to overcome this difficulty special transistors with abnormally high collector-to-emitter voltage characteristics were necessary. In addition, at the time when the high-voltage spikes occur, the conducting transistor is almost completely shorted and an extremely high pulse of current will flow. Consequently, the transistor tended to overheat and fail from this cause also.

Figure 1:
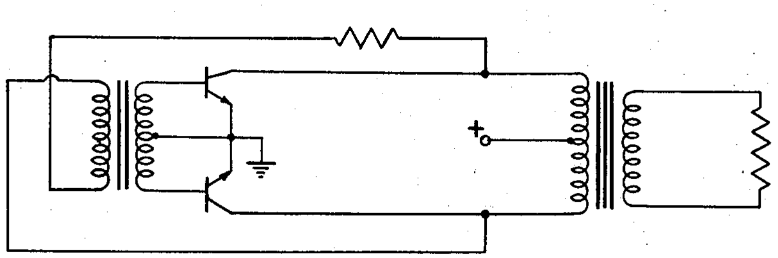
Fig. 1. (PRIOR ART)
FIG. 1 illustrates a prior art oscillator circuit, to which this invention may be applied.

The type of basic oscillator circuit to which this invention applies, is known as a Jensen-type oscillator, and FIG. 1 illustrates such a circuit. Since the operation of this well-known oscillator is quite familiar to any one skilled in the art, no detailed explanation is deemed necessary.

Figure 2:
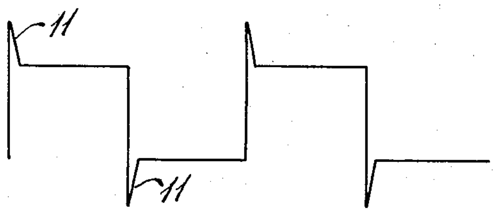
Fig. 2. (PRIOR ART)
FIG. 2 shows a typical collector-to-emitter wave form as developed during operation of FIG. 1 type oscillator.

FIG. 2 shows a typical wave form that may be developed during the operation of an oscillator according to FIG. 1. It will be noted that there is an extensive voltage spike 11 that is created at the switching time of each of the transistors during oscillation. The wave form in FIG. 2 is that of the collector-to-emitter voltage signal for one of the transistors.

Because of the extremely rapid rise time, the high-voltage transient, or spike 11, is developed which is largely due to the leakage-inductance effects in the output transformer. These transient voltage spikes can reach such magnitude as to puncture and damage the transistors. In addition, the magnetizing current flow tends to overheat the transistors.

Figure 3:
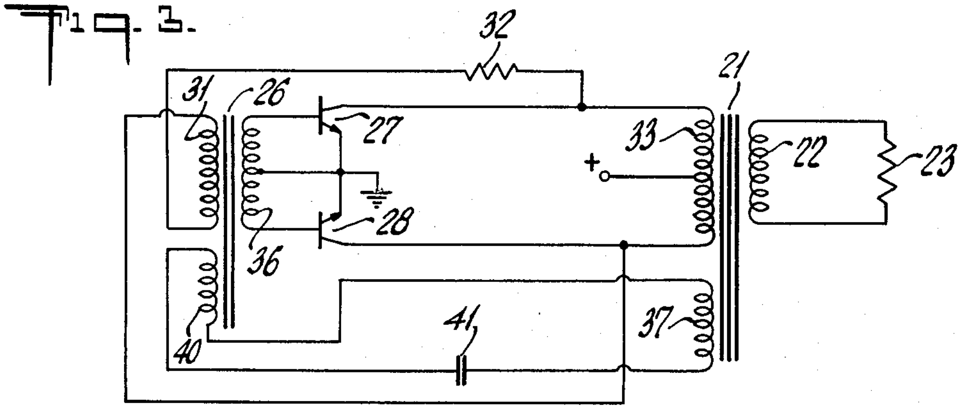
FIG. 3 illustrates a saturable core square-wave oscillator circuit according to the invention.

FIG. 3 shows a circuit according to the invention. It will be observed that there is included a basic Jensen-type oscillator circuit which includes an output transformer 21 with an output winding 22 thereon. There may be, of course, any desired load 23 connected across the output.

The oscillator of this invention also includes a saturable core transformer 26 plus a pair of transistors 27 and 28. There is also a feedback winding 31 on the saturable core transformer 26. It has a resistor 32 in the circuit that connects the feedback winding 31 regeneratively across the ends of a center-tapped winding 33 which is on the output transformer 21.

The saturable core transformer 26 also has a center-tapped winding 36 that is connected to ground at the center tap, as illustrated. The ends of this winding 36 are connected to the base of the transistors 27 and 28.

This much of the FIG. 3 circuit provides the basic square-wave saturable core transistor oscillator. It has the transconductive paths of the transistors 27 and 28 connected in series, but with opposite polarity, across the ends of the center-tapped winding 33, which is on the output transformer 21. The transistors also have biasing paths which are between the base electrodes and the emitter electrode. These biasing paths are connected serially across the center-tapped winding 36 of the saturable core transformer 26. It will be understood that the feedback winding 31 (in series with its resistor 32) is connected to provide regenerative action via the saturable core transformer 26. Its circuit is connected between the ends of the center-tapped winding 33 on output transformer 21, as illustrated.

This invention provides for an additional winding 37 located on the output transformer 21. It is connected in series-aiding relationship to another additional winding 40 that is located on the saturable core transformer 26. That series circuit includes a capacitor 41. Capacitor 41 has the capacity thereof chosen so that the loading effect on the circuit will not cause oscillation to be effected but will provide a path for magnetizing current to flow. The effect of this magnetizing current path will substantially eliminate the switching transients, e.g. spikes 11 of FIG. 2.

Figure 4:
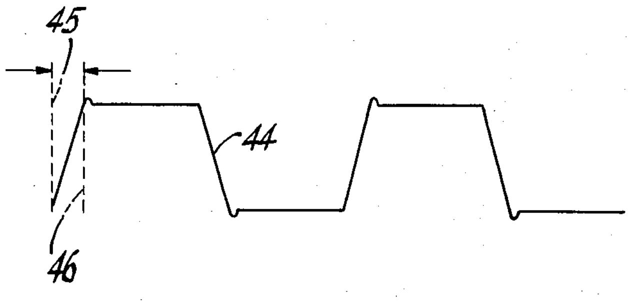
FIG. 4 illustrates a typical collector wave form as developed during operation of a FIG. 3 type oscillator.

The foregoing action, created by the addition of the extra windings 37 and 40, along with the capacitor 41, are illustrated in FIG. 4. This shows a typical collector wave form 44 during the oscillation of a circuit according to this invention, e.g., as illustrated in FIG. 3. It will be observed that the rise time (indicated by the space between dashed lines 45 and 46) has been increased. However, it will also be particularly noted that the wave form produced now substantially eliminates the voltage spikes 11 that were formerly created by a prior-art circuit, as per FIGS. 1 and 2 illustrations.

The decaying magnetizing current is now absorbed in the additional windings 37 and 40 during the charging time of the capacitor 41.

It will be clear that the advantages gained by the reduction of switching transients, include the ability to employ transistors with substantially lessened requirements of collector-to-emitter voltage rating. Furthermore, there is a reduction in the wasted power dissipation in the transistors which would accompany high switching transients. Another benefit is the ability to employ less expensive transformers, since the leakage-inductance decay reaction is contained and the transformer need not be constructed of as costly a design.

While a particular embodiment of the invention has been described above in accordance with the applicable statutes, this is not to be taken as in any way limiting the invention, but merely as being descriptive thereof.

I claim:

1. In a saturable core square-wave oscillation circuit, said circuit comprising an output transformer having a center-tapped primary winding, a saturable core transformer having a center-tapped winding and a regenerative feedback winding thereon, and a pair of transistors connected in push-pull for generating square-wave output signals in said output transformer, the improvement comprising:

an additional winding on said output transformer, an additional winding on said saturable core transformer, and circuit means for connecting said last-named two additional windings together in series-aiding relationship for absorbing leakage-inductance effects in said output transformer and increasing switching time of said transistors whereby switching transients and transistor power dissipation are greatly reduced.

2. The invention according to claim 1, wherein said circuit means comprises a capacitor therein.

3. The invention according to claim 2, wherein said circuit means also comprises a connection between one end of each of said additional windings, a connection from the other end of one of said additional windings to said capacitor; and a connection from the other end of the other of said additional windings to said capacitor.

4. The invention according to claim 3, wherein said capacitor is connected in series with said windings.

5. In a saturable core square-wave oscillator circuit having an output transformer with a center-tapped primary winding, a saturable core transformer with a center-tapped winding and a regenerative feedback winding thereon and a pair of transistors connected in push-pull for generating square-wave output signals in said output transformer, the improvement comprising:

an additional winding on said output transformer, an additional winding on said saturable core transformer, a capacitor, and circuit means for connecting said output transformer additional winding and said saturable core transformer additional winding and said capacitor all in series.

6. A square-wave transistor oscillator, comprising:

an output transformer with a center-tapped winding thereon, a saturable core transformer with a center-tapped winding and a feedback winding thereon, a pair of transistors each having a biasing path and a transconductive path, first circuit means for connecting a DC potential between the center tap on said output transformer winding and the center tap on said saturable core center-tapped winding, second circuit means for serially connecting said transconductive paths in opposite polarity across said output transformer winding, third circuit means for serially connecting said biasing paths across said saturable core center-tapped winding, fourth circuit means for connecting said feedback winding regeneratively across said output transformer winding, a first additional winding on said output transformer, a second additional winding on said saturable core transformer, a capacitor, and fifth circuit means for connecting said first and second additional windings in series-aiding relationship and in series with said capacitor.

References Cited

UNITED STATES PATENTS

| | | | |
|---|---|---|---|
| 3,550,036 | 12/1970 | Pintell | 331—113 A |
| 3,417,313 | 12/1968 | Palmer | 331—113 A |
| 3,268,833 | 8/1966 | Miller et al. | 331—113 A |

OTHER REFERENCES

Biggerstaff, "Reducing Spikes in D–C to D–C Converter Outputs," Electronics, Oct. 20, 1961, pp. 64–65.

Towers, "Practical Design Problems In Transistor D.C./D.C. Converters," The Institution of Electrical Engineers, Paper No. 2984E, April 1960, pp. 1373, 1380.

ROY LAKE, Primary Examiner

S. H. GRIMM, Assistant Examiner

U.S. Cl. X.R.

331—183